United States Patent [19]

Newman

[11] 4,179,141
[45] Dec. 18, 1979

[54] BRANCH CONNECTION FITTING

[75] Inventor: John W. Newman, Wayne, Pa.

[73] Assignee: Allied Piping Products Company, Inc., Marshall, Tex.

[21] Appl. No.: 903,026

[22] Filed: May 4, 1978

[51] Int. Cl.² .................. F16L 5/00; F16L 13/02; F16L 27/00; F16L 47/02
[52] U.S. Cl. .................................. 285/189; 228/168; 285/286
[58] Field of Search ............... 228/168, 165; 285/158, 285/156, 189, 286

[56] References Cited

U.S. PATENT DOCUMENTS

| 1,966,403 | 7/1934 | Durham | 285/158 |
| 2,915,324 | 12/1959 | Jackson | 285/286 X |
| 2,981,556 | 4/1961 | Jackson | 285/286 X |
| 3,392,994 | 7/1968 | Moore | 285/286 X |
| 3,894,757 | 7/1975 | Best | 285/189 |
| 4,015,321 | 4/1977 | Witter | 285/158 X |

FOREIGN PATENT DOCUMENTS 901179  1/1954  Fed. Rep. of Germany ......... 285/286

Primary Examiner—Mervin Stein
Assistant Examiner—Carl F. Pietruszka
Attorney, Agent, or Firm—Harding, Earley & Follmer

[57] ABSTRACT

A cylindrical branch connection fitting has an end adapted to be welded to a main pipe adjacent an opening therein with a pair of opposed ears and a pair of opposed crotches and a weld bevel extending outwardly from the inner edge of said end. A transition bevel extends from the center of each ear towards the centers of the crotches.

4 Claims, 5 Drawing Figures

BRANCH CONNECTION FITTING

BACKGROUND OF THE INVENTION

For many years the exclusive design of intersection weld type fittings was characterized by a tapered skirt which lends itself quite readily to forging. The main body of the fitting in the longitudinal plane has a wall thickness of between 4.0 to 7 times the nominal wall thickness of the main pipe. Although full replacement of area was often achieved for the purpose of compliance with the pressure piping codes, the very great difference in wall thickness between the fitting and the main pipe leads to severe stress concentration factors in the fatigue environment. As a result stress intensification factors of 1.75 and higher are often found in forged fittings. Additionally, the heavy wall thickness of the fitting requires a substantial amount of weld for proper installation. A typical forged fitting of this character is disclosed in Durham U.S. Pat. No. 1,966,403 except for the fact that the wall thickness of the fitting as shown in the drawings is too small in relation to the main pipe to provide adequate burst strength.

While a cylindrical single bevel fitting is superior it still requires a substantial weld metal volume which is a problem which increases with the increase of fitting size.

Many of the problems encountered with the above discussed fittings were solved in the fitting disclosed in Best U.S. Pat. No. 3,894,757 which teaches the employment of a cylindrical branch pipe connection with a weld bevel and a transition bevel of uniform width around the contour of the fitting. While a decided improvement, a typical problem with this arrangement is with high pressure piping subject to external bending moments where due to the notch effect in the longitudinal plane of the intersection weld, a high stress intensification factor is experienced which leads to premature failure due to metal fatigue. The present invention reduces very substantially the amount of weld required for the installation of the weld fitting as contrasted to the single bevel fitting, while it does not reduce the fatigue resistance of the branch connection or the internal pressure performance achieved by the single bevel fitting.

In accordance with this invention a marked improvement over the fittings of the prior art is achieved by employing a cylindrical fitting having a weld bevel and a transitional bevel extending from the center of each ear towards the centers of the crotches with the width of the transitional bevels gradually decreasing. This provides for economic welding of the fitting to the main pipe and provides superior fatigue resistance by overcoming the notch effect of previous cylindrical fittings.

SUMMARY OF THE INVENTION

The invention involves a cylindrical branch pipe connection fitting of substantially uniform wall thickness in the range of from about 95% to about 350% of the nominal wall thickness of the header pipe with which the fitting is to be used. The fitting has at one end a pair of ears with their centers lying in the transverse plane through the axis of the fitting and a pair of crotches with their centers lying in the longitudinal plane through the axis of the fitting and having the other end adapted to be connected to a branch pipe. As used in the trade and as specifically used herein the term "transverse plane" connotes the plane containing the axis of the fitting and to which the axis of the main pipe is perpendicular. Similarly, the longitudinal plane is the plane containing the axis of the fitting and through the axis of the main pipe. In accordance with the invention a weld bevel on said one end of the fitting extends outwardly from the inner edge of said one end with the bevel angle in the transverse plane (herein denoted angle A which is shown in FIG. 5) being in the range from about angle B between the axis of the fitting and a line from the intersection of the axes of the main pipe and fitting to one inner edge of the weld bevel in said transverse plane (FIG. 5) to about angle B plus 40° (advantageously angle B plus from about 10° to about 25°). The portions of the weld bevel outside of the transverse plane have a bevel angle in the range of from about the bevel angle of the weld bevel in the transverse plane (bevel angle A) to said angle (bevel angle A) minus 20°. A pair of transition bevels each extend from the center of an ear towards the centers of the crotches and terminate at the centers of the crotches or removed therefrom a linear distance measured along the outside edge of the weld bevel up to about 0.40 times the outer diameter of the fitting. The bevel angle of each transition bevel is in the range equal to weld bevel angle A referred to above divided by from about 1.75 to 2.5 and the maximum depth of each transition bevel at the center of each ear is from about 0.2 to about 0.5 times the maximum wall thickness of the fitting. The transition bevels narrow gradually as they extend from the center of the ears towards the centers of the crotches.

As used herein and in the claims the angle of any particular portion of a bevel is the angle between that portion of the bevel or an extension thereof intersecting the exterior surface of the fitting and an intersecting line lying on the exterior surface of the fitting and in a plane containing the axis of the fitting. The depth of a bevel is the depth of the fitting wall through which the bevel extends.

DETAILED DESCRIPTION

Figures 1, 2:
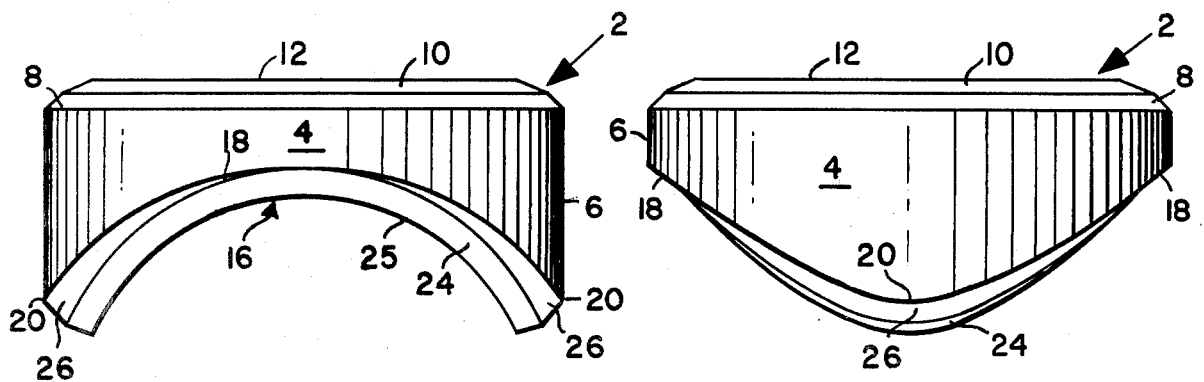
FIG. 1 is an elevational view of a crotch side of a fitting in accordance with the invention.
FIG. 2 is an elevational view of an ear side of a fitting in accordance with the invention.

A branch pipe fitting 2 in accordance with the invention has a cylindrical body 4 with a wall 6 of substantially uniform thickness. Body 4 has a transition bevel 8 and a weld bevel 10 for welding end 12 of body 4 to a branch pipe. It will be understood that the fittings of the invention are useful irrespective of the means for connecting the branch pipe to the fitting. For example, the connection may be a threaded or socket weld connection.

The end 16 of body 4 is contoured to engage a header pipe adjacent the periphery of a branch orifice in the header pipe. End 16 has a pair of opposed crotches 18, 18 and a pair of opposed ears 20, 20. A weld bevel 24 extends about the crotches 18 and ears 20 extending outwardly from the inner edge 25 of end 16. A transition bevel 26 extends from the center of each ear towards the center of the crotches decreasing in width in the direction of the crotches.

Figure 3:
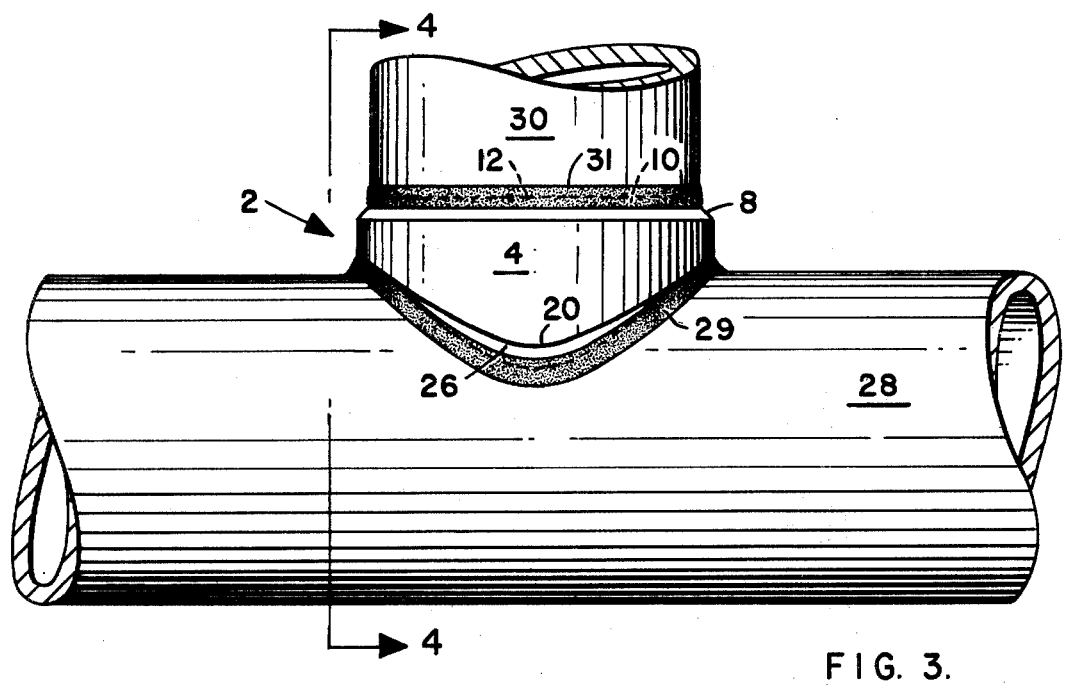
FIG. 3 is a side elevation of a header pipe with a fitting of the invention secured to a branch opening therein.
Figure 4:
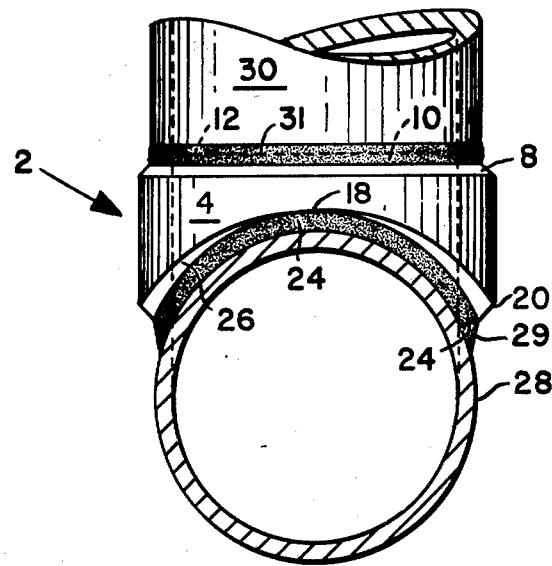
FIG. 4 is a vertical section taken on the plane indicated by the line 4—4 in FIG. 3.

Adverting to FIGS. 3 and 4, fitting 2 is secured to a header pipe 28 by a weld 29 and to a branch pipe 30 by a weld 31. The wall thickness of fitting 2 is in the range of from about 95% to about 350% of the nominal wall thickness of the header pipe 28.

Figure 5:
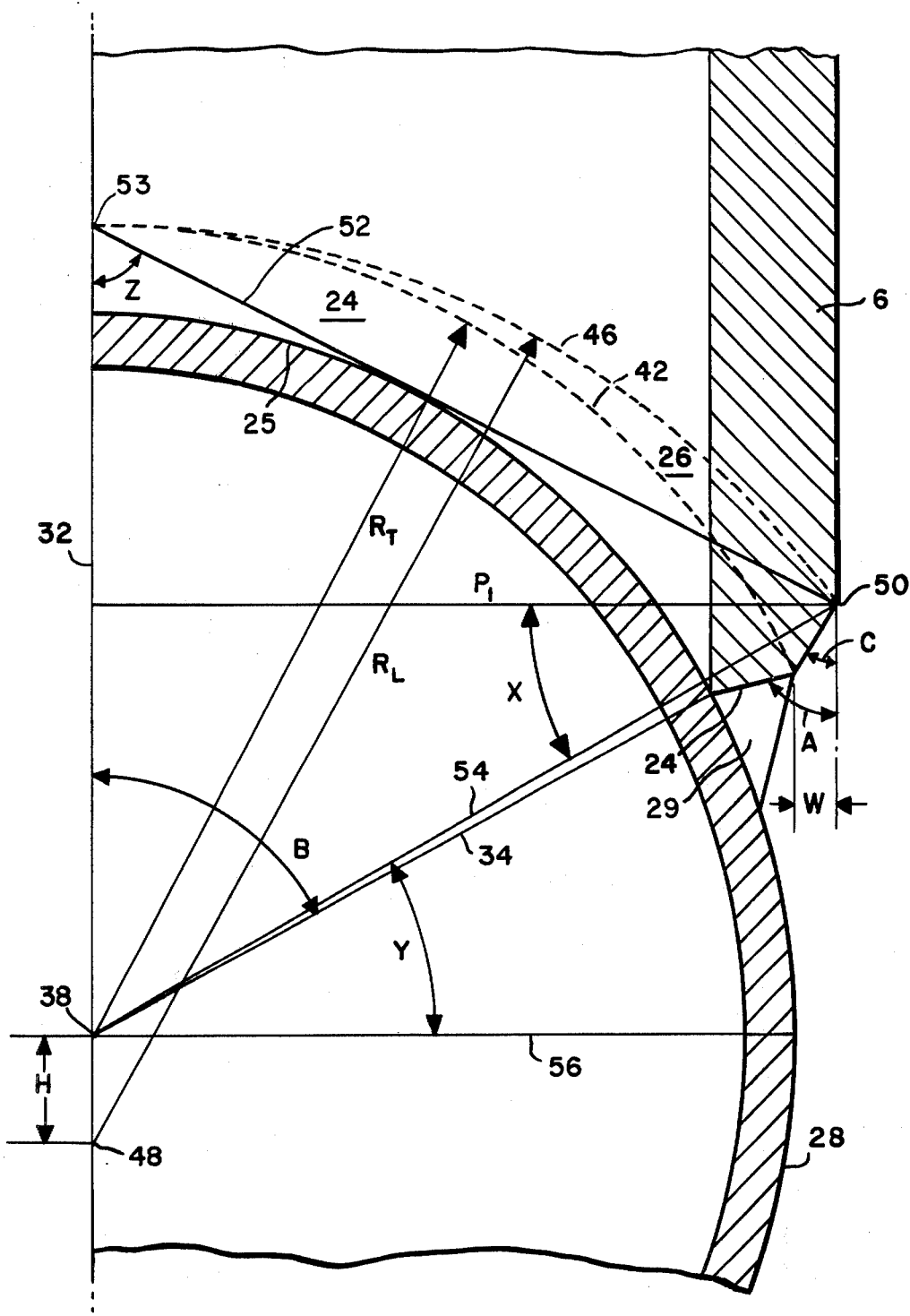
FIG. 5 is an enlarged transverse section, partially broken away, of the fitting and header pipe of FIG. 3.

Referring now to FIG. 5, the bevel angle A of weld bevel 24 is equal to the angle B between the fitting axis 32 and a line extending from the intersection of the axes of the fitting and of header pipe 28 which is indicated at 38 and the inner edge of weld bevel 24 in the transverse plane plus from 0° to 40° (advantageously plus about 10° to about 25°). Transition bevel 26 intersects the outer edge 42 of weld bevel 24 and in the transverse plane as shown in FIG. 5 and extends through a thickness W of fitting wall 6 equal to from about 0.2 to 0.5 times the maximum thickness of wall 6. The bevel angle of each transition bevel in the transverse plane, angle C, is equal to weld bevel angle A divided by from about 1.75 to about 2.5. The transition bevels narrow from the center of the ears in the direction of the crotches.

Line 46 where the transition bevel 26 intersects the exterior of the fitting gradually approaches the outer edge 42 of the weld bevel 24 unit it intersects its edge either in the longitudinal plane of the fitting or at a point on the outside edge of the weld bevel removed from the longitudinal plane by a linear distance along said edge up to about 0.40 times the outer diameter of the fitting.

While not essential, intersection line 46 may have a constant radius $R_L$ with $R_L$ having a length equal to the distance between a point 48 on the axis of the fitting and below the intersection 38 of the axes of the fitting and the header pipe 28 (see FIG. 5) and point 50 which is the point of intersection between the transition bevel 26 and the exterior of the fitting in the transverse plane. The distance H between point 38 and point 48 can readily be determined by the following formula:

$$H = \frac{(.8 \text{ to } 1.5)(\cos Z)\sqrt{P_1^2 + (R_T - \sin \times (R_T + \frac{W}{\sin Y}))^2} - R_T}{2}$$

in which Z is the angle between axis 32 and a line 52 in the transverse plane between the outer edge of the transition bevel (point 50) and a point 53 on fitting axis 32 which is intersected by a horizontal plane passing through the outer edge of weld bevel 24 lying in the longitudinal plane (FIG. 5), $P_1$ equals the length of line $P_1$ which extends from point 50 to the axis 32 of the fitting and is perpendicular thereto, $R_T$ equals the radius $R_T$ of the outside edge 42 of weld bevel 24, x is the angle between line $P_1$ and line 54, W equals the depth of the fitting wall through which the transition bevel extends, Y equals the angle between line 54 between points 38 and 50 and the plane 56 extending through the axis of the header pipe 28 and to which the axis 32 of the fitting is perpendicular. The use of this formula is merely convenient and illustrative of how line 46 can be determined.

Within the scope of the term substantially uniform thickness as applied to the walls of the fitting as used herein, it is contemplated that the inner diameter at the contoured end of the fitting may be slightly enlarged as may be desired to provide desirable flow characteristics in a manner known to the trade.

It will be understood that the above described fitting is illustrative and is not intended to be limiting.

I claim:

1. In a cylindrical branch pipe connection fitting for use with a header pipe of substantially uniform wall thickness having at one end a pair of ears with their centers lying in the transverse plane through the axis of the fitting, and a pair of crotches with their centers lying in the longitudinal plane through the axis of the fitting, and having the other end adapted to be connected to a branch pipe the improvement comprising:

a weld bevel on said one end of the fitting extending outwardly from the inner edge of said one end with the weld bevel angle A in the transverse plane being in the range of from about angle B between the axis of the fitting and a line from the intersection of the axes of the header pipe and fitting to an inner edge of the weld bevel in said transverse plane to about angle B plus 40° with the portions of the weld bevel outside of the transverse plane having a bevel angle in the range of from about weld bevel angle A to about weld bevel angle A minus 20°, a pair of transition bevels each extending from the center of an ear towards the centers of the crotches with the outer edge of the transition bevel gradually approaching and intersecting the outer edge of the weld bevel, the bevel angle of each transition bevel being in the range equal to weld bevel angle A divided by from about 1.75 to 2.5 and the maximum depth of each transition bevel being at the center of the ear and being from about 0.2 to about 0.5 times the maximum wall thickness of the fitting and the fitting having a maximum wall thickness in the range of from about 95% to about 350% of the header pipe.

2. A branch pipe connection fitting in accordance with claim 1 in which the transition bevels terminate at a linear distance from the centers of the crotches measured along the outside edge of the weld bevel up to about 0.40 times the outer diameter of the fitting.

3. A branch pipe connection fitting in accordance with claim 1 in which the transition bevels terminate at about the centers of the crotches.

4. A branch pipe connection fitting in accordance with claim 1 in which said bevel angle A is in the range of from about said angle B to about angle B plus from about 10° to about 25°.

* * * * *